Dec. 1, 1970   C. L. BARTLETT   3,544,223
PROFILE COMPARATORS

Filed May 6, 1968                     4 Sheets-Sheet 1

INVENTOR
CHRISTOPHER LESLIE BARTLETT
BY Mawhinney & Mawhinney
ATTYS

Dec. 1, 1970  C. L. BARTLETT  3,544,223
PROFILE COMPARATORS

Filed May 6, 1968  4 Sheets-Sheet 3

INVENTOR
CHRISTOPHER LESLIE BARTLETT
BY: Mawhinney & Mawhinney
ATTYS

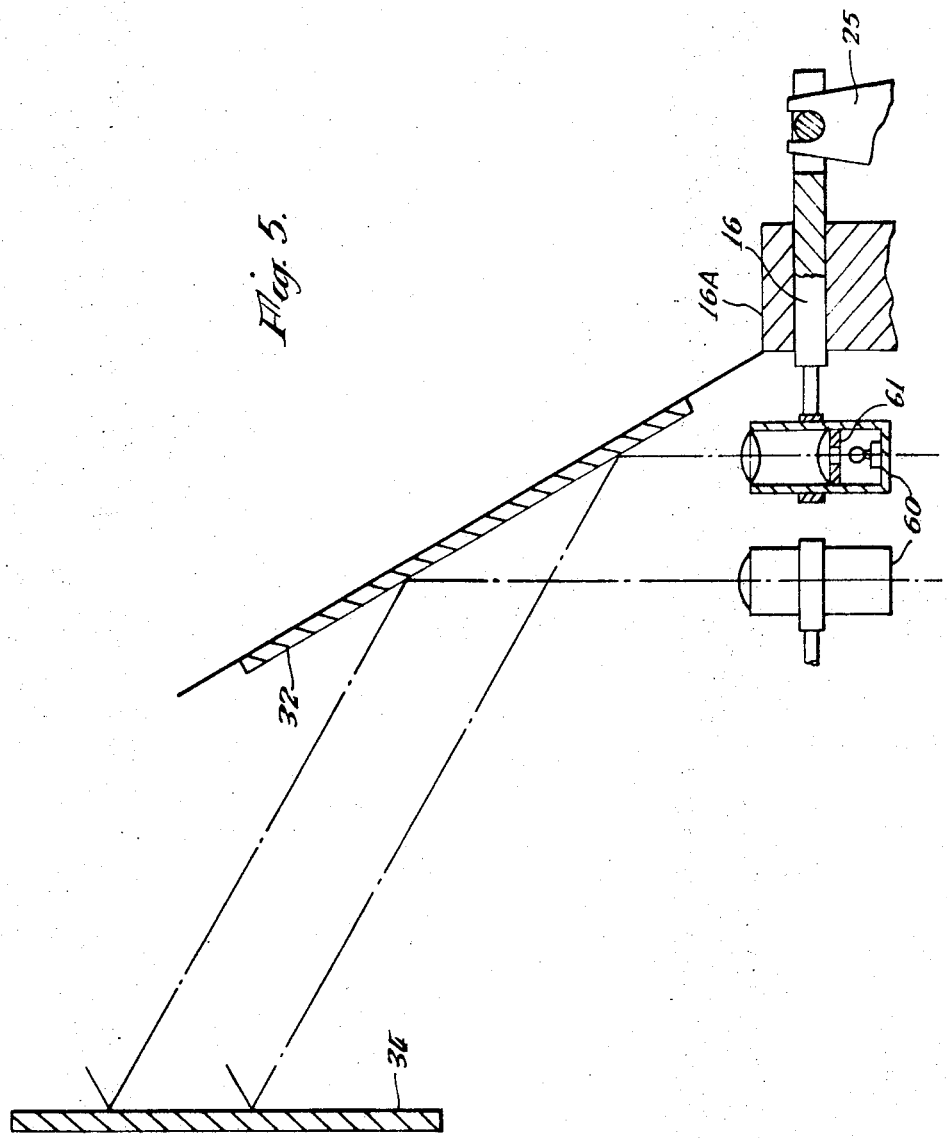

United States Patent Office 3,544,223
Patented Dec. 1, 1970

3,544,223
PROFILE COMPARATORS
Christopher L. Bartlett, Filton, Bristol, England, assignor, by mesne assignments, to Rolls-Royce Limited, Derby, England, a British company
Filed May 6, 1968, Ser. No. 726,728
Claims priority, application Great Britain, May 9, 1967, 21,382/67
Int. Cl. G01b 9/08
U.S. Cl. 356—165                                    4 Claims

ABSTRACT OF THE DISCLOSURE

The disclosure of this invention pertains to a profile comparator wherein relative movement between a probe and a work piece is converted into relative movement between a pointer and a screen and wherein an image of the pointer is projected onto the screen by a projector. The pointer is connected to a first slide supported for movement in a first direction on a second slide supported for movement in a second direction perpendicular to the first direction, and the projector is secured to the second slide so as to move together with the pointer when the latter is moved in the second direction. Thereby the aperture of the projector need not be larger than the extent of movement in the first direction. Alternatively the projector is connected directly to the pointer so as to be movable together therewith in both directions.

---

This invention relates to a profile comparator, i.e. a machine for inspecting the profile of a work piece by visual comparison with a master profile.

It is known in such comparators to convert relative movement between a probe and a work piece into relative movement between a pointer and a screen and to project an image of the pointer onto the screen so that the relative movement of the probe appears as relative movement between the image and the screen. The screen has mounted thereon a master of the profile to be inspected and during said relative movement of the image an operator can see whether the profile of the work piece corresponds to that of the master.

In known comparators the pointer is movable relative to an optical projector cooperating to project said image, and the fact that the pointer is movable relative to the projector means that the optical aperture of the projector has to be of a diameter large enough to embrace the whole of the movement of the pointer. This requires costly optical systems and unduly large size of the apparatus in the case where the profile is relatively large. Further, where the profile is of elongate form, only a narrow part of said aperture is used and the remainder of the costly optical system is unused. It is among the objects of the invention to overcome or reduce these disadvantages.

According to this invention there is provided a profile comparator having means for converting relative two-dimensional movement between a probe and a work holder into relative movement between a pointer and a screen, and a projector for projecting an image of the pointer onto the screen, characterized in that the projector is connected to the pointer to be movable together therewith in at least one of the two coordinate directions of the movement of the pointer relative to the screen.

It will be seen that since the pointer is not wholly movable relative to the projector but moves together therewith in the direction of at least one coordinate, the aperture of the projector can be correspondingly small.

Figure 1:
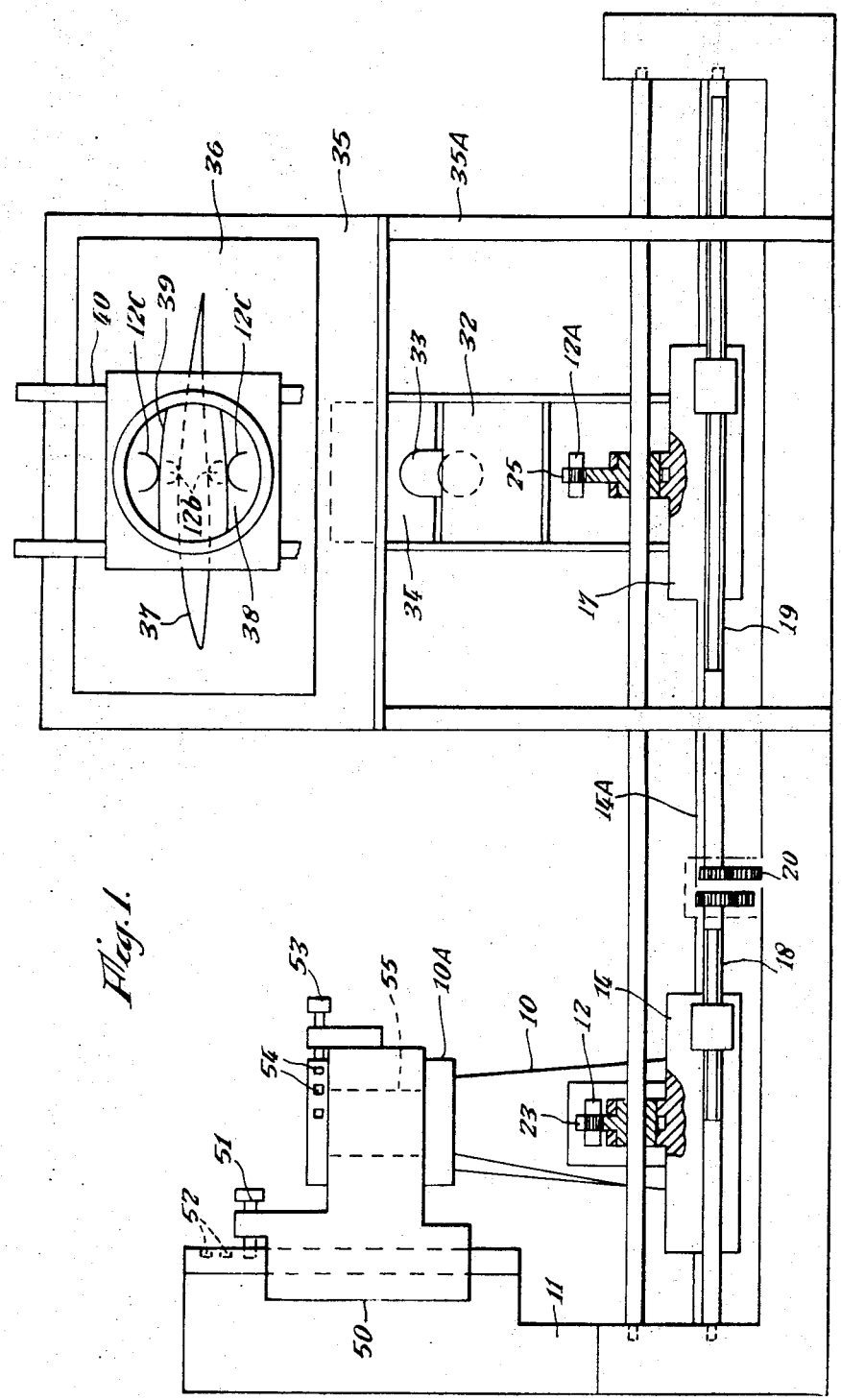
Figure 2:
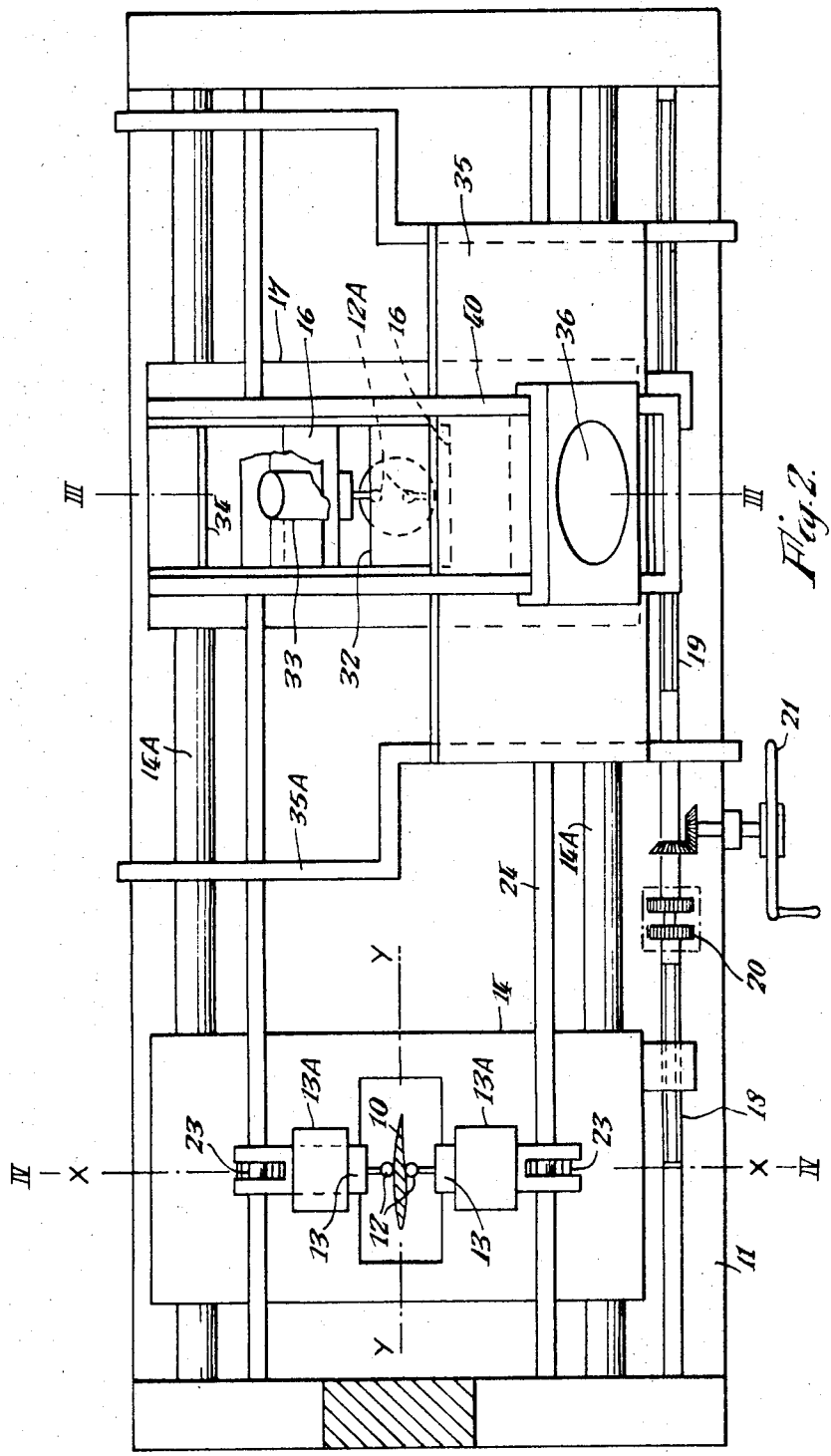
Figure 3:
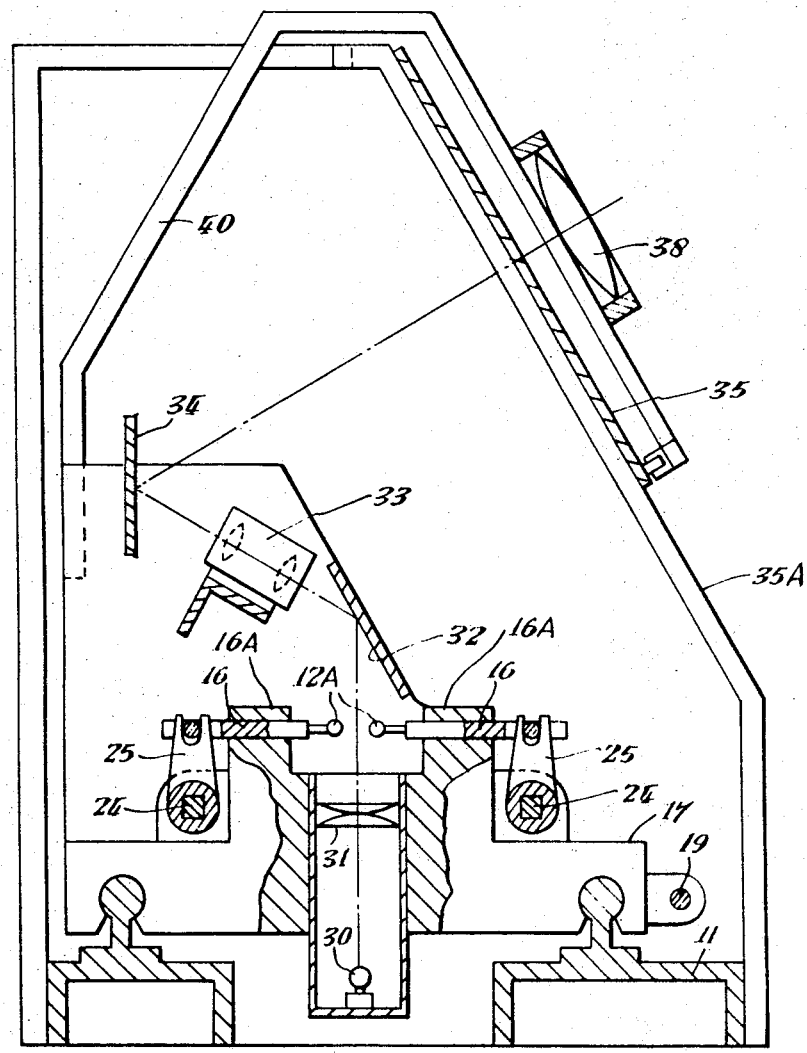
Figure 4:
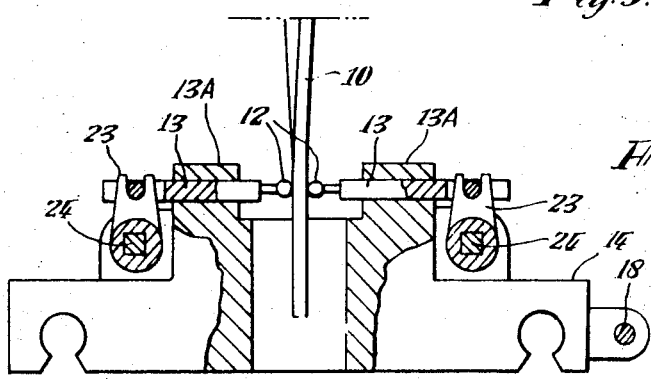

A constructional example of a comparator according to this invention will not be described with reference to the accompanying drawings wherein:

FIG. 1 is a front elevation of the comparator.
FIG. 2 is a plan view of FIG. 1, partly in section.
FIG. 3 is a section on the line III—III in FIG. 2.
FIG. 4 is a section on the line IV—IV in FIG. 2.
FIG. 5 is a modified detail of FIG. 3 drawn to an enlarged scale.

Referring to FIGS. 1 to 4, a work piece 10 is supported by a holder 10A on a frame 11 and is engaged by a pair of opposite probes 12 secured to slides 13 supported for movement in the x-direction by bearings 13A secured to a slide 14 supported on the frame 11 by guides 14A for movement in the y-direction. Means (not shown) are provided to bias the probes 12 into contact with the work piece. Movement of the probes 12 is transmitted respectively to a pair of pointers 12A secured to slides 16 supported for movement in the x-direction by bearings 16A secured to a slide 17 supported on the frame 11 by the guides 14A for movement in the y-direction.

The slide 14 is adapted to be moved by a screw 18 connected to a screw 19 adapted to drive the slide 17, the connection between the two screws being through a gearing 20 such that when the screw 19 is rotated by a hand wheel 21 (FIG. 2) the slide 17 moves a greater distance, in this case three times further, than the slide 14. Thus as regards movement in the y-direction the connection between the probes and the pointers is such that displacement of the pointers 12A is three times greater than the corresponding displacement of the probes. The movement of the probes in the x-direction is similarly increased but the increase is effected in port mechanically and in part optically. To effect the mechanical enlargement each probe 12 is connected to a lever 23 supported for pivotal but against axial motion on the carriage 14 and adapted to transmit its rotation through a shaft 24 to a longer lever 25 supported for pivotal but against axial motion on the carriage 17. Each shaft 24 is supported for rotation on the frame 11 and only has rotation-transmitting engagement with the levers 23, 25. The levers 25 are 1.5 times longer than the levers 23 so that the displacement of the pointers is 1.5 times greater than the displacement of the probes.

The pointers 12A are projected on to a screen 35 by an optical system constituting a projector and comprising a light source 30 acting via condenser lenses 31 to project a shadow of the pointers via a mirror 32, the projector lenses 33 and a further mirror 34 onto the back of the screen 35 there to show images 12b of the pointers 12A against a master 37 provided on a drawing 36 affixed to the screen 35. The lenses 33 are adapted to magnify so that displacement of the images 12B is twice that of the pointers 12A. Hence to total magnification of the displacement of the probes 12 in the x-direction is by a factor of 3 which is equal to said displacement in the y-direction.

The optical system, i.e. the elements 30 to 34 are secured to the carriage 17. The screen 35 is secured to the frame 11 by a supporting structure 35A. It is clear that in the x-direction the pointers are moved relative to the optical system and relative to the screen while in the y-direction the pointers and the optical system are jointly moved relative to the screen.

To enlarge the operator's view of the images 12B and the master 37 still further, there is provided in front of the screen 35 a lens 38 dimensioned to enlarge the images 12B and the adjacent part of the master so that the images 12B appear as images 12C and the lines of the master appear as lines 39. The lens 38 may, for example, have a magnification factor of 2 so that the total magnification factor is 6. As shown, the lens 38 has a diameter sufficient to cover the width of the profile to be inspected, and the lens 38 is connected to the carriage 17 by a support structure 40 to move together with the carriage 17 in the y-direction to cover the length of the profile. By providing such a lens the magnification can be increased without the need for a corresponding increase in the size of the screen or, alternatively, a given magnification can be attained with a correspondingly smaller screen and smaller projector.

The work holder 10A includes a slide 50 supported in the frame 11 for movement in the direction perpendicular to the plane of the profile to be inspected and a plunger 51 cooperates with equispaced recesses 52 for locating the workpiece in different positions along the slide 50 relative to a datum. The holder 10A is supported in a bearing 55 for rotation about an axis perpendicular to the plane in which the probes 12 are movable, and the holder 10A includes a plunger 53 cooperating with equispaced recesses 54 for locating the workpiece in different angular positions. The purpose of these locating means is that they enable different profiles along the length of the workpiece to be inspected with due regard to the angular position of the profile in relation to a datum. This is of importance, for example, in the case of blades for axial flow compressors. Such blades have different profiles at different positions along their length and the different profiles have different angles relative to a datum. By means of the locating means 51, 52 and 53, 54 the position of the blade can be set in relation to the x and y directions so that the length of the profile is aligned substantially to the y-direction, and the masters for each of the profiles along the length of the blade can be positioned on the screen to accord precisely with the angular position of the blade as given by the recesses 54. The different profiles of the blade may all be drawn on the same master in different angular positions thereon. The screen may be rotatable for the positioning of any one of these master profiles to be rotated into parallelism with the corresponding profile on the blade.

It will be seen that since the projector moves together with the pointer in the y-direction the aperture of the projector need only be large enough for the movement in the x-direction. Assuming the profile of the workpiece to be nominally 10 inches long and 2 inches thick, then at a magnification of 3:1 the screen has to be 30 inches wide but the projector need only have an aperture to accommodate 3 inches of pointer travel. If, as would be the case in a conventional comparator, the projector were made large enough to accommodate the whole of the 10 inches of the length of the profile, this would not only require a disproportionately expensive optical system but also the larger focal lengths of such a system would require correspondingly large size apparatus. Also, the projector would have to illuminate the whole of the screen, whereas in the apparatus according to the invention only an area of 6 inches diameter need be illuminated (in this example).

It will be appreciated that the magnification in the x-direction need not be partly mechanical and partly optical but may be wholly optical or wholly mechanical. The main criterion is that the total magnification in the x-direction should be the same as in the y-direction. So, for example, the levers 23, 25 can be made to be of the same length while the projector lenses 33 are adapted to produce a magnification factor of 3.

An example of a case wherein the magnification is wholly mechanical is now described with reference to FIG. 5. This is essentially the same as FIG. 3 but the ball-shaped pointers 12A of FIG. 3 are replaced by projectors 60 adapted to project a circle of light via the mirrors 32, 34 onto the screen 35 so that the images 12C or 12B of FIG. 3 are replaced by circles of light. In this case there is no optical magnification of the movement of the probes in the x-direction and this magnification is arranged to be wholly mechanical, e.g. by making the levers 25 of appropriate length relative to the levers 23. Projectors such as the projectors 60 are well-known per se and the pointer in this case is defined as an aperture in a member 61 through which light passes from a light source into the lens system of the projector.

What is claimed is:

1. A profile comparator comprising means for holding a workpiece, a probe for contacting a workpiece held by said means, means supporting the probe for two-dimensional motion relative to the workpiece, a first and a second member supported for motion in mutually perpendicular directions, means for resolving the two-dimensional motion of the probe into component motions being respectively motions of the first and the second member, mechanical means for enlarging the motion of one of the members relative to motion of the other other member, a pointer, means supporting the pointer for two-dimensional motion, means for transferring the enlarged motion of the one and the motion of the other member into two-dimensional motion of the pointer, a screen, an optical element arranged between the pointer and the screen to project an image of the pointer onto the screen, the optical element being connected to said mechanical means to move together with the pointer in the direction of said relatively enlarged one component motion but to be stationary relative to the pointer as regards movement thereof in the other one of the component motions, and the optical element being arranged to optically enlarge movement relative thereto of the pointer to an extent equal to the relative enlargement of the one component motion by said mechanical means.

2. Profile comparator according to claim 1 including means (53, 54, 55) for indexing the work holder (10A) about an axis perpendicular to the plane of said relative two-dimensional movement of the probe.

3. Profile comparator according to claim 1 including an optical magnifying means (38) situated at the side of the screen (35) remote from the optical element (33, 60) to provide locally a magnified view of the screen, means (40) whereby the magnifying means is supported for movement in a plane parallel to that of the screen, and means (40) whereby the magnifying means is connected to the pointer to move together therewith in a direction corresponding to the direction of said mechanically enlarged one component motion.

4. A profile comparator comprising means for holding a workpiece, a probe for contacting a workpiece held by said means, a first slide (13) to which the probe (12) is secured, a second slide (14) supporting the first slide for movement in a first direction, means (14A) for supporting the second slide for movement in a second direction perpendicular to the first direction, a pointer, a third slide (16) to which the pointer is secured, a fourth slide (17) supporting the third slide for movement in the first direction, means (14A) for supporting the fourth slide for movement in the second direction, a stationary screen, an image enlarging projector (33) secured to the fourth slide for movement therewith and cooperating to project an image of the pointer onto the screen and further cooperating to effect enlargement of the relative movement between the pointer and the screen in the first direction, mechanical means (23, 25) for transmitting movement in the first direction between the first and third slides at a given ratio, and mechanical means (20) for transmitting movement in the second direction between the second and fourth slides at a ratio which is the product of said given ratio and the enlargement ratio of the projector.

References Cited

UNITED STATES PATENTS

| 2,400,942 | 5/1946 | Milner | 356—164 |
| 2,580,239 | 12/1951 | Murch et al. | 356—165 |
| 2,799,206 | 7/1957 | Fuller | 356—165 |
| 2,930,283 | 3/1960 | Smith et al. | 356—164 |
| 3,029,690 | 4/1962 | Jackson | 356—164 |

FOREIGN PATENTS

| 694,950 | 1953 | Great Britain | 356—165 |

WILLIAM L. SIKES, Primary Examiner

J. ROTHENBERG, Assistant Examiner

U.S. Cl. X.R.

353—80